United States Patent Office 3,037,820
Patented June 5, 1962

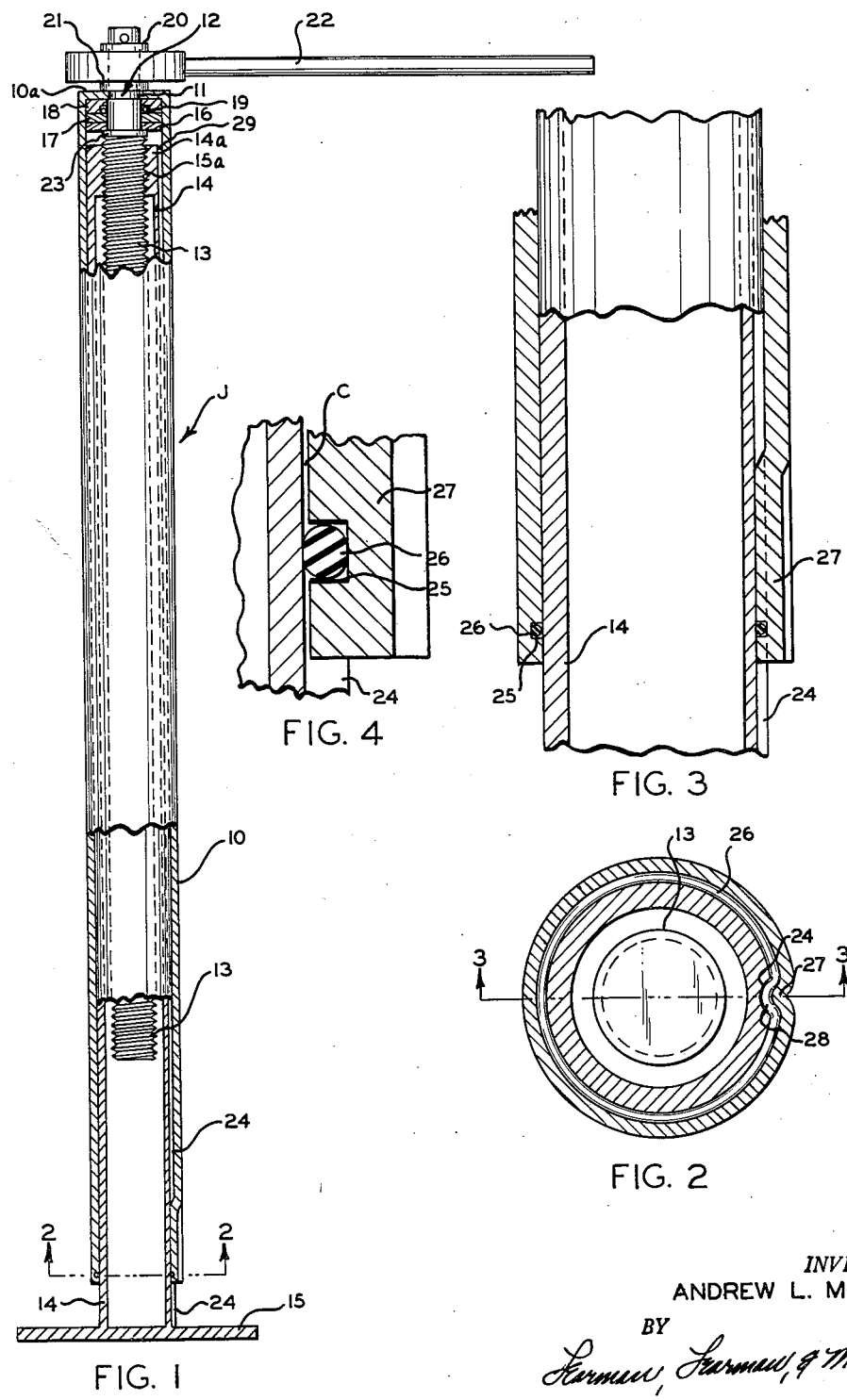

3,037,820
SEAL MEANS FOR KEYED TELESCOPING
MEMBERS
Andrew L. Morlik, Saginaw, Mich., assignor to Saginaw Products Corporation, Saginaw, Mich., a corporation of Michigan
Filed Mar. 10, 1960, Ser. No. 14,070
6 Claims. (Cl. 308—3.5)

This invention relates to telescoping member assemblies of the type which are keyed to prevent relative rotation of the members, and more particularly to an assembly of this character which incorporates an effective seal.

Considerable difficulty has been encountered in effectively, and yet economically, sealing jack assemblies, for example, which must be protected against the entry of grit, water, and other foreign matter, and must retain their supply of lubricant, in order to remain in operative condition for any appreciable length of time. Briefly, the instant invention is concerned with certain novel and useful improvements in assemblies of this kind which comprise telescoping members in which a key and keyway are provided, and in such a manner that a conventional seal of regular configuration, such as an O-ring, can be satisfactorily employed to close the operating clearance between the members. The invention is particularly suited to the economical manufacture and assembly of jacks which, because of the novel and effective construction to be described, have a much longer operating life and do not freeze up in cold weather.

One of the principal objects of the invention is to provide a design of the type mentioned which permits a conventional O-ring to be used as the sealing member, and shapes the O-ring in a manner to prevent its tendency to roll during telescoping movement of the extensible member to thus overcome one of the principal problems encountered when an O-ring is employed as a sealing member for axially extensible parts.

A corollary object of the invention is to provide an assembly of this character which avoids the use of loose keys and special seals which are shaped to the shape of a key or keyway.

A further object of the invention is to provide a seal incorporating, telescoping member assembly in which the insertion of one telescoping member into the other assures proper location of the O-ring member.

A still further object of the invention is to provide a highly reliable and durable assembly in which an effective seal is provided without affecting the smooth operation of the parts.

Other objects and advantages of the invention will be pointed out specifically or will become apparent from the following description when it is considered in conjunction with the appended claims and the accompanying drawings, in which:

FIGURE 1 is a partly sectional, elevational view of a jack incorporating the invention;

FIGURE 2 is an enlarged, transverse, sectional view taken on the line 2—2 of FIGURE 1 and showing a section of the O-ring seal within the keyway in the extensible member;

FIGURE 3 is an enlarged, fragmentary, elevational view taken on the line 3—3 of FIGURE 2 and further illustrating the manner in which a portion of the O-ring seal is received within the keyway; and FIGURE 4 is an enlarged, fragmentary, elevational view illustrating the sliding clearance employed.

Referring now more particularly to the accompanying drawings, wherein I have shown a jack which incorporates the invention, a letter J generally designates the jack structure, which includes an outer tube member or sleeve 10 of annular configuration. The sleeve 10 has an upper end wall 10a provided with an opening 11 to receive an operating shaft generally designated 12, as shown. The shaft 12, which is journaled for rotation in the opening 11 and is threaded as at 13 throughout most of its length, mounts an extensible, inner tubular member 14 which has a jack supporting base 15 provided on its lower end. The upper end of the inner sleeve member 14, which is restrained from rotation with the shaft 12 in a manner to be presently described, has an upper end wall 14a functioning as a nut which is provided with a threaded bore 15a to receive the threaded portion 13 of the operating shaft 12. With shaft 12 restrained from axial movement in a manner to be described, and inner sleeve member 14 restrained from rotation, it will be clear that rotation of shaft 12 will cause axial movement of the inner sleeve member 14 in the usual manner.

Provided in the upper end of the jack outer member 10 and having registering openings to journal the shaft 12 are a thrust washer 16, a thrust bearing 17, and a retainer slug 18 having an O-ring seal 19. Collars 20 and 21 on the upper end of the shaft 12 retain an operating handle 22 which is provided to facilitate manual rotation of the shaft 12 and preferably takes the form of a hexagonal socket, reversible ratchet wrench of conventional type. The collar 21 and a shoulder 23 provided on the shaft 12 prevent axial movement of the shaft 12.

The construction so far described is typical of jacks in common use and difficulty has been encountered in the past with foreign matter and water entering the slight clearance space which is provided between the outer tube member 10 and the inner tube member 14. While the drawings do not show a clearance between these members, except in FIGURE 4 at C, since a telescoping operating clearance would only be in the nature of multiple thousandths of an inch, it is to be understood that the same operating clearance exists peripherally between the relatively movable sections 10 and 14. Moisture entering between the outer and inner tube sections 10 and 14, respectively, tends to freeze in cold weather and prevent the normal operation of the jack and will rust the parts, and the accumulation of grit and other foreign matter between the tube sections and in the mating threads of the nut portion 14a and shaft 13 also obviously would affect the operation of the jack. It was with the virtually absolute prevention of the entry of foreign substances in mind that the seal construction of the present invention was designed and, in addition, it was designed to retain lubricant within the jack.

In the preferred form of the invention which is illustrated, the inner tube member 14 is provided with a milled or otherwise suitably formed keyway 24 extending from the base 15 to the other end of the member 14. Near its lower end, the outer tube section 10 has a perimetral or peripheral groove 25 milled in its inner peripheral wall surface, as shown, which is of a depth to receive a conventional, resilient, rubber O-ring 26 in a manner such that the inner periphery of the O-ring projects beyond the groove 26 and fills the operating clearance between the outer tube member 10 and inner tube member 14. The O-ring 26 may be said to be snugly received on the inner tube member 14 in the sense that it prevents the entry of foreign matter but is not so snugly received that it interferes with the telescoping movement of the inner tube section 14.

The problem which is solved by the applicant is that of effectively sealing off the keyway 24 with the O-ring member 26. This is accomplished by inserting the O-ring 26 in the retaining groove 25 prior to assembly of the inner tube section 14 within the outer tube section 10. Also prior to the assembly of the tube section 14, an axially extending section 27, which includes the groove 25, is pressed inwardly, as best illustrated in FIGURES 2 and 3. Displacement of the grooved portion of the section 27, which is of a predetermined arcuate projection less than the receiving space of the keyway 24, kinks the O-ring 26 as at 28 and displaces a section of the O-ring inwardly into the keyway 24 to form a key which not only serves to prevent the rotation of the inner tube section 14 with the shaft 12 but also functions to seal the keyway 24. Further, the kinking of the O-ring 26 to form the key portion 28 tends to prevent rolling of the O-ring 26 with telescoping of the section 14 and enables it to better perform its function of sealing the tube sections 10 and 14. At its upper end, the inner tube section 14 is beveled, as shown at 29, so that, when the inner tube section 14 is inserted within the outer tube section 10, the beveled portion 29 serves to wedge the O-ring 26 in position. Because the shape of groove 25 is rectangular while the O-ring shown is circular in cross-section, the O-ring which is slightly greater in diameter than the depth of the groove has space to move into when it is squeezed by the sections 10 and 14.

It will thus be seen that I have perfected a seal construction which can be incorporated in jacks and like members having relatively telescoping sections, where economy of manufacture and effective sealing are factors of the greatest importance. The method in which the members are keyed and sealed is believed not only to be novel but also to constitute a considerable improvement in the art.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. In combination; a pair of non-rotatable, telescopically mounted members, one of which is located within the other, there being a sliding clearance therebetween; one of said members having a perimetral groove opening to the other member and the other of said members having an axial groove extending in the direction of telescopic movement; seal means, having a configuration corresponding substantially to the configuration of the clearance between said members, mounted in said perimetral groove and projecting therefrom sufficiently to fill said clearance; and a pressed out section, formed in said member having the perimetral groove, extending axially in the direction of telescopic movement in the portion of said latter member having the perimetral groove to displace a portion of the seal into said axial groove in the other member.

2. In combination; a pair of non-rotatable, telescopically mounted members, one of which is located within the other, there being a sliding clearance therebetween; one of said members having means for retaining a seal and the other of said members having an axial groove extending in the direction of telescopic movement; a seal having a configuration corresponding to the configuration of the clearance between said members mounted by said means for retaining a seal; and a key formed on said member having the means for retaining a seal extending axially in the direction of telescopic movement in the portion thereof mounting the seal and displacing a portion of the seal into said axial groove in the other member.

3. In combination; a pair of non-rotatable, telescopically mounted members, one of which is located within the other, there being a sliding clearance therebetween; one of said members having means for retaining a seal, one of said members also having an axial keyway extending in the direction of telescopic movement; a seal having a configuration corresponding to the configuration of the clearance between said members and filling said clearance mounted by said means for retaining a seal; and a pressed out section formed in one of said members adjacent said seal extending axially in the direction of telescopic movement to displace a portion of the seal into said keyway.

4. In combination; a pair of non-rotatable, telescoping, tubular members, one of which is located within the other, there being a sliding clearance therebetween; said outer member having a perimetral groove in its interior wall surface and the inner member having an axial keyway extending in the direction of telescoping movement; a seal having a configuration corresponding substantially to the configuration of the clearance between said members mounted in said perimetral groove and projecting from said groove sufficiently to fill said clearance; and a section in said outer member comprising a portion of the wall thereof pressed inwardly from the said wall and extending axially in the direction of telescopic movement in the portion thereof having the perimetral groove to displace a portion of the seal into said keyway in the inner member.

5. The combination defined in claim 4 in which one end of the inner member is beveled to facilitate assembly of said members.

6. In combination; a pair of telescopically mounted members, one of which is located within the other, there being a sliding clearance therebetween; means for preventing relative rotation of said members including an axial groove in one of said members extending in the direction of telescopic movement, the other member having means for retaining a seal; seal means, having a configuration corresponding substantially to the configuration of the clearance between said members, mounted by said means for retaining a seal and projecting therefrom sufficiently to fill said clearance; said means for preventing relative rotation of said members also including a pressed out section, formed in said member having the means for retaining a seal, extending axially in the direction of telescopic movement in the portion of said latter member having the means for retaining a seal to displace a portion of the seal means into said axial groove in the other member.

References Cited in the file of this patent

UNITED STATES PATENTS

| | | |
|---|---|---|
| 564,741 | Dunn | July 28, 1896 |
| 1,536,986 | Thiemer | May 25, 1925 |
| 2,571,500 | Trevaskis | Oct. 16, 1951 |
| 2,708,374 | Engh | May 17, 1955 |
| 2,908,152 | Anderson | Oct. 13, 1959 |